United States Patent
Amler et al.

(10) Patent No.: US 12,353,417 B1
(45) Date of Patent: Jul. 8, 2025

(54) DISK GROUP-BY WITH SORTED MERGE

(71) Applicant: SAP SE, Walldorf (DE)

(72) Inventors: Andreas Amler, Heidelberg (DE); Till Merker, Sandhausen (DE); Nico Bohnsack, Mauer (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/777,428

(22) Filed: Jul. 18, 2024

(51) Int. Cl.
| | |
|---|---|
| G06F 16/24 | (2019.01) |
| G06F 16/242 | (2019.01) |
| G06F 16/245 | (2019.01) |
| G06F 16/2455 | (2019.01) |
| G06F 16/27 | (2019.01) |

(52) U.S. Cl.
CPC ...... *G06F 16/24557* (2019.01); *G06F 16/244* (2019.01); *G06F 16/24552* (2019.01); *G06F 16/278* (2019.01)

(58) Field of Classification Search
None
See application file for complete search history.

(56) References Cited

U.S. PATENT DOCUMENTS

| | | | |
|---|---|---|---|
| 10,061,808 B2* | 8/2018 | Kim | G06F 16/24552 |
| 2006/0116989 A1* | 6/2006 | Bellamkonda | G06F 16/24556 |
| 2014/0317088 A1* | 10/2014 | Al-Omari | G06F 16/24542 |
| | | | 707/718 |
| 2018/0081946 A1* | 3/2018 | Bondalapati | G06F 16/2456 |
| 2018/0300373 A1* | 10/2018 | Mittal | G06F 16/24535 |
| 2022/0318147 A1* | 10/2022 | Anand | G06F 16/21 |

* cited by examiner

*Primary Examiner* — Son T Hoang
(74) *Attorney, Agent, or Firm* — SCHWEGMAN LUNDBERG & WOESSNER, P.A.

(57) ABSTRACT

In an example embodiment, a specialized execution process for a Disk Group-By operator with at least one distinct or ordered aggregation is provided. This specialized execution process involves writing all linked lists to disk (optionally this is performed only if the memory budget is coming close to being surpassed). Initially, a separate disk partition can be created per group, but once a partition becomes too large a new partition for the group is created. A partition is considered too large if it would not be able to be loaded into memory without surpassing the memory budget. As a result, every group can have a list of one or more disk partitions attached to it. The data belonging to each group is sorted using a sorted merge from disk.

20 Claims, 5 Drawing Sheets

DISK GROUP-BY WITH SORTED MERGE

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
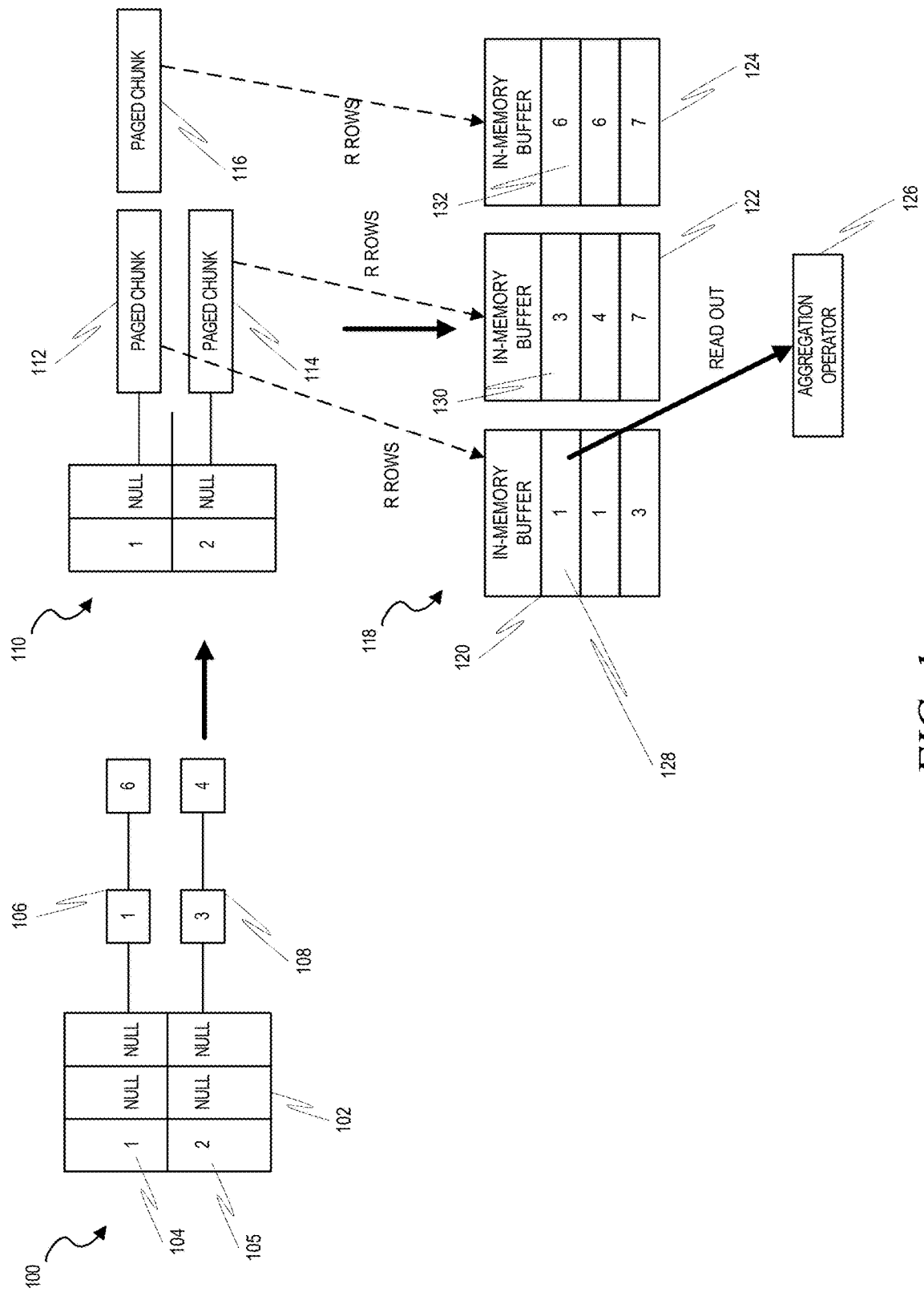
FIG. 1 is a diagram illustrating the use of disk partitions to execute a Disk Group-By operator with at least one distinct or ordered aggregation, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Relational database systems store large amounts of data, including business data that can be analyzed to support business decisions. Typically, data records in a relational database management system in a computing system are maintained in tables, which are a collection of rows all having the same columns. Each column maintains information on a particular type of data for the data records which comprise the rows. Tables that are accessible to the operator are known as base tables, and tables that store data that describe base tables are known as catalog tables. The data stored in the catalog table is not readily visible to an operator of the database. Rather the data stored in the catalog table pertains to metadata. In the case of a database, the metadata stored in the catalog table describes operator-visible attributes of the base table, such as the names and types of columns, as well as statistical distribution of column values. Typically, a database comprises catalog tables and base tables. The catalog tables and base tables function in a relational format to enable efficient use of data stored in the database.

A relational database management system uses relational techniques for storing, manipulating, and retrieving information, and is further designed to accept commands to store, retrieve, and remove data. Structured Query Language (SQL) is a commonly used and well-known example of a command set utilized in relational database management systems, and shall serve to illustrate a relational database management system. An SQL query often comprises predicates, also known as user-specified conditions. The predicates are used to limit query results. One common operation in an SQL query is a Group-By operation where data is segmented into groups and aggregate information is derived for these groups. The Group-By operation partitions a relation into non-overlapping sets of rows from one or more tables, and then mathematically manipulates separately over each set. The number of results produced by a Group-By operation depends on the number of non-overlapping sets of rows, which in turn depends on the number of columns of the Group-By operation.

In other words, the Group-By operation divides a table into sets. It can be combined as a clause with aggregate functions that produce summary values for each of the sets. For example, the Query:

SELECT order_num, COUNT (*) number, SUM (total_price) price
FROM items
GROUP BY order_num;
causes the rows of an items table to be collected into groups, each group composed of rows that have identical order_num values (the items of each order are grouped together). After the database server forms the groups, the aggregate functions COUNT and SUM are applied within each group. The output is one row for each group, such as the following example output:

| order_num | number | price |
|---|---|---|
| 1001 | 1 | $ 250.00 |
| 1002 | 2 | $1200.00 |
| 1003 | 3 | $ 959.00 |
| 1004 | 4 | $1416.00 |
| . | | |
| . | | |
| . | | |
| 1021 | 4 | $1614.00 |
| 1022 | 3 | $ 232.00 |
| 1023 | 6 | $ 824.00 |

Execution of a Group-By operation may occur in two phases. In an insert phase, incoming rows are collected into thread-local hash maps. Every entry in a hash map represents one group. In a merge/materialize phase, all the local hash maps from the insert phase are merged and the final aggregation results are calculated. The resulting rows are then passed to the next operator or output.

There are two types of aggregation, however, that are treated differently than other aggregation types. These include distinct or ordered aggregations. A distinct aggregation is an aggregation that contains a limitation that applies the aggregation function to only a unique set of attribute values within a given partition. This is typically denoted by the aggregation command including the DISTINCT keyword or itself being a command that inherently contains such a limitation. For example, the DISTINCT-COUNT operator provides a count of the number of distinct items in a set, and thus inherently contains a limitation that applies the aggregation function to only a unique set of attribute values within a given partition. Another example would be SUM (DISTINCT X). Here, the SUM operator does not inherently contain such a limitation, but the inclusion of the DISTINCT operator in a clause means that the SUM aggregation is a distinct aggregation.

An ordered aggregation is an aggregation that relies on ordering of elements in order to calculate a value. An example of an ordered aggregation is MEDIAN, in which values in a set are ordered and the middle-most value is selected as the output.

When distinct or ordered aggregations having a group-by clause are implemented, each group is assigned a different linked list of values. Thus, each entry in the hash map is assigned its own linked list. For example, the command DISTINCTCOUNT (B) GROUPBY product type, would create a separate linked list for each product type and populate these linked lists with the values for B within each corresponding product type. In the merge/materialize phase, these lists are then sorted and then the aggregation command is applied to the sorted lists. In the case of DISCTINCT-COUNT this means the sorted lists would each be iterated over and the unique values within each counted. For a MEDIAN command, the value in the middle of each sorted linked list would be retrieved.

DISKGROUPBY (sometimes referred to as disk group-by) is a specialized version of the GROUPBY command that is used when it is desirable to prioritize memory efficiency. This operator is assigned a memory budget that it must not surpass. This operator is processed by initially partitioning incoming rows using grouping columns as keys and results are written to disk. Then the partitions are recursively re-partitioned until each partition is small enough to be processed in memory within the budget. Subsequently, each partition is loaded into memory one after the other to process the Group-By on each of them.

A technical problem, however, is encountered if a Disk Group By operator is performed with at least one distinct or ordered aggregation. When the values in each partition are loaded into memory, they are loaded into linked lists. It is possible, however, that a linked list can be too large to fit with the memory budget, simply due to the number of values in the group causing the linked list to have too many entries for the memory budgeted. This cannot be solved using the partitioning mechanism, since partitioning only is performed by group (in other words, a single group cannot be split any further).

In an example embodiment, a specialized execution process for a Disk Group-By operator with at least one distinct or ordered aggregation is provided. This specialized execution process involves writing all linked lists to disk (optionally this is performed only if the memory budget is coming close to being surpassed). Initially, a separate disk partition can be created per group, but once a partition becomes too large a new partition for the group is created. A partition is considered too large if it would not be able to be loaded into memory without surpassing the memory budget. As a result, every group can have a list of one or more disk partitions attached to it. The data belonging to each group is sorted using a sorted merge from disk.

In the sorted merge from disk, assuming N disk partitions containing data, the following operations are performed. For each partition, the partition is loaded into memory, sorted, and then written back. Then, using the sorted partitions, an N-way merge is performed. A small in-memory buffer is used for each partition that is continuously fed rows from the sorted partitions. The buffered rows are merged and streamed into a separate operator. This operator uses the incoming rows to update the aggregation result, prior to discarding them.

For DistinctCount, this would mean that a count is increased by one whenever a value of a row is received that is different from the previous row. This works because the rows have already been sorted. For Median, the first M/2 incoming rows are ignored, assuming M is the total number of rows in the partitions for the group, and then the next value read is the median value.

The result is that a Disk Group-By operator is able to be performed with at least one distinct or ordered aggregation without the possibility of the calculation process itself exceeding the provided memory budget.

FIG. 1 is a diagram illustrating an example of using disk partitions to execute a Disk Group-By operator with at least one distinct or ordered aggregation, in accordance with an example embodiment. Here, in an insert phase 100, a hash map 102 is created with two entries, one entry for a first group 104 and one entry for a second group 105. Each of the entries has their own linked list 106, 108, respectively, containing actual values from rows for the corresponding groups in the underlying data. When the sum of the sizes of these linked lists 106, 108 approaches a memory budget limit, then all of the linked lists 106, 108 are written to disk. This is depicted at reference numeral 110, with a paged chunk 112, 114 corresponding to each respective linked list 106, 108, the paged chunk 112, 114 representing the disk partition for the group. As additional values from the underlying data set get added, the paged chunks 112, 114 may grow, but at a certain point paged chunk 112 grows to a size that approaches the memory budget limit for the corresponding group. Future values from the underlying data set that are added for that corresponding group are then added into a newly-created paged chunk 116.

In a merge phase 118, the values in the paged chunk 112 are read out to memory, sorted, and then written back into memory. Similar read out, sorting, and writing back is performed for each of the other paged chunks 114, 116.

Then, a separate in-memory buffer 120, 122, 124 is provided for each partition (i.e., paged chunk 112, 114, 116, respectively). Each in-memory buffer stores a small number of rows (r) at a time (e.g., 3 rows) from their respective partition. Thus, three rows are added from paged chunk 112 to in-memory buffer 120, three rows from paged chunk 114 are added to in-memory buffer 122, and three rows from paged chunk 116 are added to in-memory buffer 124. Since the paged chunks 112, 114, 116 were already individually sorted, the rows in each of the in-memory buffers 120, 122, 124 are also already sorted, with the smallest values at the top of each in-memory buffer 120, 122, 124.

A merge operation is then performed on the top row of each in-memory buffer 120 124 in the group (here group 1), which takes the smallest valued row and removes it, sending it on to aggregation operator 126. Thus, as can be seen here, of the top rows 128, 132, top row 128 has the lowest value and is removed and sent to aggregation operator 126. While not pictured here, this results in the remaining rows of in-memory buffer 120 moving up. A similar merge can be performed for the top tow of the in-memory buffer 122 for group 2, although since there is only one top row 130 in the in-memory buffer 122, then that top row 130 is the one removed. The merge operation is then performed again, which again takes the smallest valued top row of all of the in-memory buffers for each group and removes it, sending it on to aggregation operator 126.

This process keeps repeating. When an in-memory buffer 120, 122, 124 has all of its rows removed, an additional r rows are retrieved from its corresponding paged chunk. This keeps repeating until all rows have been removed from all paged chunks and all in-memory buffers are empty.

While this iterative process is going on, the aggregation operator 126 is able to keep updating its calculations as each row is received. Depending upon the type of aggregation operation being performed, this may or may not mean that the aggregation operator 126 can find its solution prior to all rows being read out of the in-memory buffers. If the aggregation operator 126 does manage to find its solution prior to all rows being read out of the in-memory buffers, then there is no need to continue the iterative process on the merging of the in-memory buffers. For example, if the aggregation operator 126 implements a Median command, then once M/2 rows have been received by the aggregation operator 126 the aggregation operator 126 may simply use the very next row received as containing the median and processing may stop. On the other hand, if the aggregation operator 126 implements a DistinctCount command, then it can increase a counter by one whenever a value is received in a row that is different than the immediately preceding value received in a row. This will continue to count until all rows have been read out of all in-memory buffers.

Figure 2:
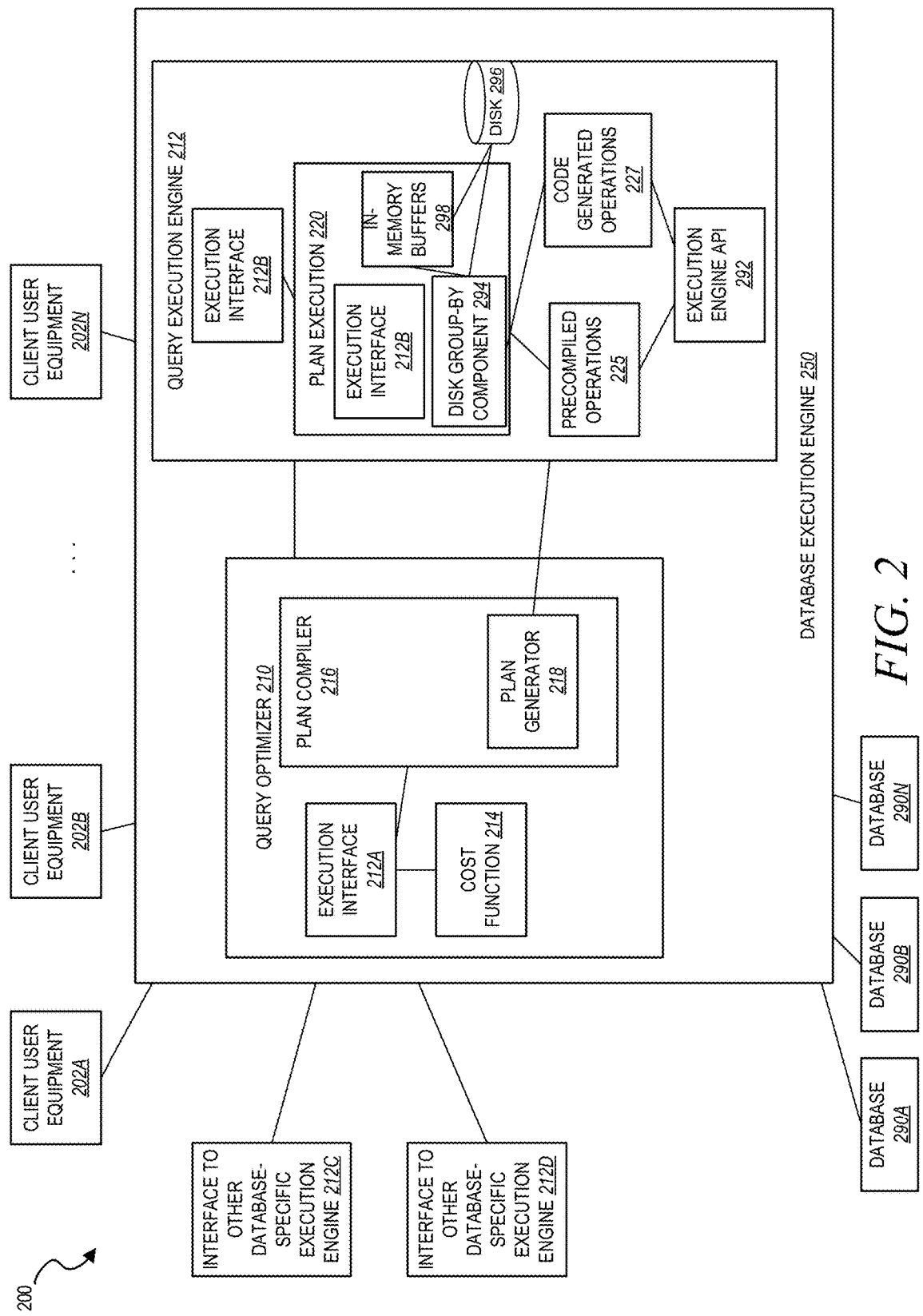
FIG. 2 is a block diagram illustrating a database management system, in accordance with some example implementations.

FIG. 2 is a block diagram illustrating an example of a database management system 200, in accordance with some example implementations.

The database management system 200 may include one or more user equipment 202A, 202B, . . . , 202N, such as a computer, a smartphone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 290A, 290B, . . . , 290N, and/or to receive responses to those queries.

In the example of FIG. 2, the databases 290A, 290B, . . . , 290N represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 202A, 202B, . . . , 202N may send a query via an execution engine 250 to the databases 290A, 290B, . . . , 290N, which may represent a persistence and/or storage layer where database tables may be stored and/or queried. The query may be sent via a connection, such as a wired and/or wireless connection (e.g., the Internet, cellular links, WiFi links, and/or the like).

The database execution engine 250 may include a query optimizer 210, such as a SQL optimizer and/or another type of optimizer, to receive at least one query from a user equipment and generate a query plan (which may be optimized) for execution by the execution engine 212. The query optimizer 210 may receive a request, such as a query, and then form or propose an optimized query plan. The query plan (which may be optimized) may be represented as so-called "query algebra" or "relational algebra."

For example, a database command "SELECT id, x, n FROM T1 JOIN T2 ON T1.x=T2.x ORDER BY T2.n LIMIT K" may be received by the database execution engine 250 including the query optimizer 210. There may be several ways of implementing execution of this query. As such, the query plan may offer hints or propose an optimum query plan with respect to the execution time of the overall query.

To optimize a query, the query optimizer 210 may obtain one or more costs for the different ways the execution of the query plan can be performed. The costs may be obtained via the execution interface 212A from a cost function 214, which responds to the query optimizer 210 with the cost(s) for a given query plan (or portion thereof), and these costs may be in terms of execution time at the databases 290A, 290B, . . . , 290N, for example.

The query optimizer 210 may form an optimum query plan, which may represent a query algebra, as noted above. To compile a query plan, the query optimizer 210 may provide the query plan to the query plan compiler 216 to enable compilation of some, if not all, of the query plan. The query plan compiler 216 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, a plan compiler may select pre-compiled code for a given operation as part of the optimization of the query plan, while for another operation in the query plan, the plan compiler may allow a compiler to generate the code. The pre-compiled and generated code represents code for executing the query plan, and this code may be provided to the plan generator 218, which interfaces with the query execution engine 212.

In some implementations, the query optimizer 210 may optimize the query plan by compiling and generating code. Moreover, the query optimizer 210 may optimize the query plan to enable pipelining during execution.

In some implementations, the query optimizer 210 may be configured to select other execution engines. For example, the query optimizer 210 may select via interface 212C, an execution engine configured specifically to support a row-store database or an ABAP type database, or the query optimizer 210 may select, via interface 212D, an execution engine configured specifically to support a column-store type database. In this way, the query optimizer 210 may select whether to use the universal database execution engine 250 or legacy (e.g., database-specific) execution engines (available via interfaces 212C/D, for example).

The query execution engine 212 may receive from the plan generator 218, compiled code to enable execution of the optimized query plan, although the query execution engine may also receive code or other commands directly from a higher-level application or other device, such as user equipment 202A-N.

The query execution engine 212 may then forward, via an execution interface 212B, the code to a plan execution engine 220. The plan execution engine 220 may then prepare the plan for execution, and this query plan may include pre-compiled code 225 and/or generated code 227. When the code for the query plan is ready for execution during runtime, the query execution engine 212 may step through the code performing some of the operations within the database execution engine 250 and sending some of the operations (or commands in support of an operation, such as a read, write, and/or the like) to the execution engine application programming interface (API) 292 for execution at one or more of databases 290A-N.

In an example embodiment, a disk group-by component 294 may be provided in the plan execution engine 220. The disk-group-by component 294 acts to write linked lists involved in Disk Group-By operator with at least one distinct or ordered aggregation to a disk 296 (optionally this is performed only if the memory budget for the Disk Group-By operator is coming close to being surpassed, such as being within a predetermined threshold amount of memory of a per-group memory budget derived from the memory budget for the Disk Group-By operator as a whole). The data belonging to each group is sorted using a sorted merge from disk.

In the sorted merge from disk, assuming N disk partitions containing data, the following operations are performed. For each partition, the partition is loaded into memory, sorted, and then written back. Then, using the sorted partitions, an N-way merge is performed. In-memory buffers 298 (one for each partition) are continuously fed rows from the sorted partitions. The buffered rows are merged and streamed into a separate operator. This operator uses the incoming rows to update the aggregation result, prior to discarding them.

Figure 3:
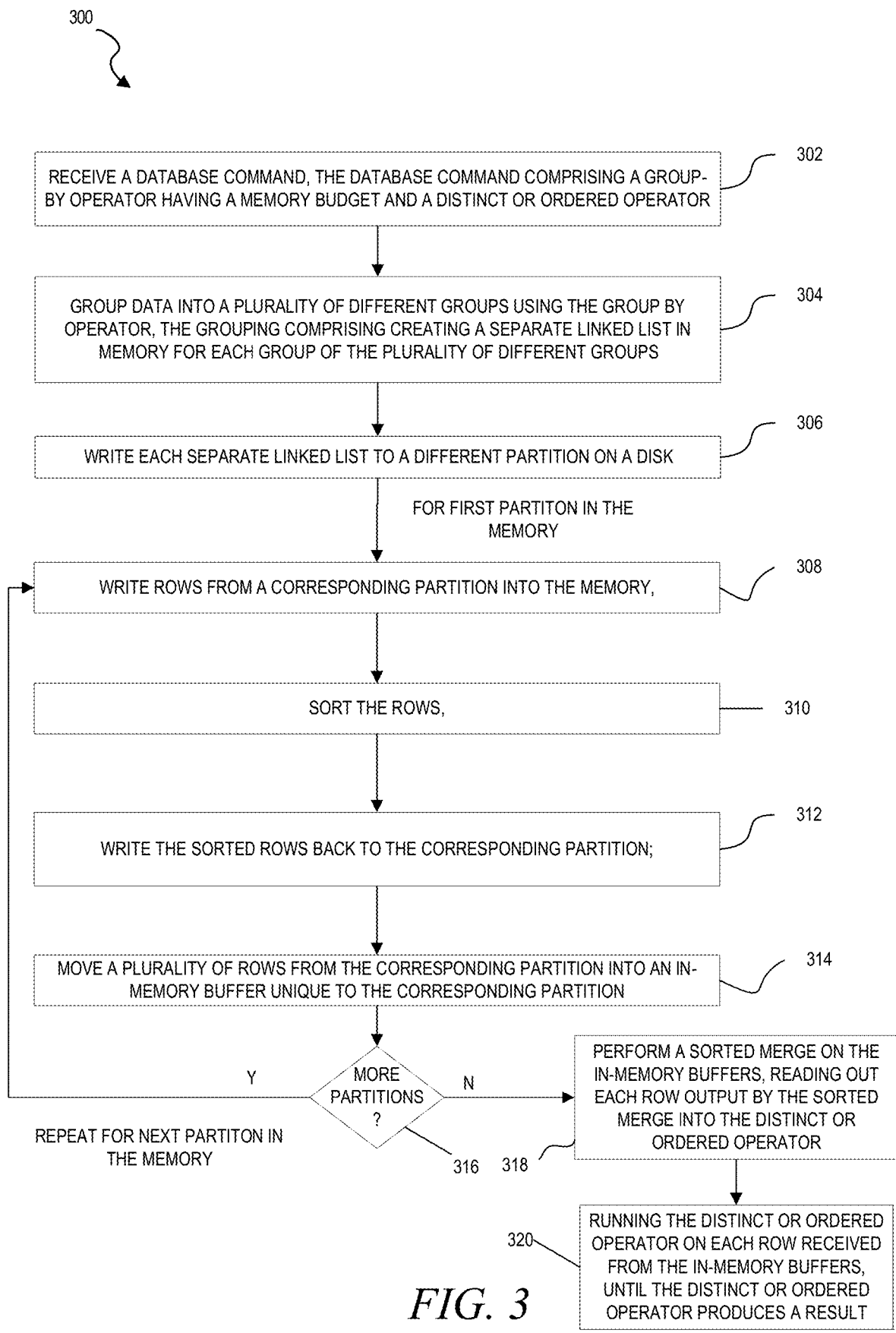
FIG. 3 is a flowchart of a method for processing a group-by operator with a distinct or ordered operator, in accordance with an example embodiment.

FIG. 3 is a flowchart of an example method 300 for processing a group-by operator with a distinct or ordered operator, in accordance with an example embodiment.

At operation 302, a database command is received. The database command comprises a group-by operator having a memory budget and a distinct or ordered operator.

At operation 304, data is grouped into a plurality of different groups using the group-by operator, the grouping comprising creating a separate linked list in memory for each group of the plurality of different groups.

At operation 306, each separate linked list is written to a different partition on a disk.

A loop is then begun for each partition on the disk, beginning with a first partition. At operation 308, rows from a corresponding partition are written into the memory. At operation 310, the rows are sorted. At operation 312, the sorted rows are written back to the corresponding partition. At operation 314, a plurality of rows are moved from the corresponding partition into an in-memory buffer unique to the corresponding partition.

At operation 316, it is determined if there are any more partitions in the memory. If so, then the method 300 repeats back up to operation 308, for the next partition in the memory. If not, then at operation 318 a sorted merge is performed on the in-memory buffers, reading out each row output by the sorted merge into the distinct or ordered operator. At operation 320, the distinct or ordered operator is run on each row received from the in-memory buffers, until the distinct or ordered operator produces a result.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1 is a system comprising: at least one hardware processor; a computer-readable medium storing instructions that, when executed by the at least one hardware processor, cause the at least one hardware processor to perform operations comprising: receiving a database command the database command comprising a group-by operator having a memory budget and a distinct or ordered operator; grouping data into a plurality of different groups using the group-by operator, the grouping comprising creating a separate linked list in memory for each group of the plurality of different groups; writing each separate linked list to a different partition on a disk; for each partition on the disk: writing rows from a corresponding partition into the memory; sorting the rows; writing the sorted rows back to the corresponding partition; and moving a plurality of rows from the corresponding partition into an in-memory buffer unique to the corresponding partition; performing a sorted merge on the in-memory buffers, reading out each row output by the sorted merge into the distinct or ordered operator; and running the distinct or ordered operator on each row received from the in-memory buffers, until the distinct or ordered operator produces a result.

In Example 2, the subject matter of Example 1 comprises, wherein the writing each separate linked list, the writing rows from a corresponding partition, the sorting the rows, the writing the sorted rows, and the moving the plurality of rows are performed in response to a determination that a memory allocated to all of the separate linked lists is within a predetermined threshold amount of memory from the memory budget.

In Example 3, the subject matter of Examples 1-2 comprises, wherein the distinct or ordered operator is a median operator.

In Example 4, the subject matter of Examples 1-3 comprises, wherein the distinct or ordered operator is a distinct count operator.

In Example 5, the subject matter of Examples 3-4 comprises, the row is received, wherein M is equal to a total number of rows in all of the different partitions, and then outputting a value in a next received row as a solution to the median operator.

In Example 6, the subject matter of Examples 3-5 comprises, wherein the operations further comprise: assigning a per-group memory budget to each group in the plurality of different groups, based on the memory budget of the group-by operator; and in response to a determination that the corresponding partition for a given group is within a predetermined threshold amount of memory from the per-group memory budget, creating another corresponding partition for the given group for additional values from the linked list corresponding to the given group.

In Example 7, the subject matter of Examples 1-6 comprises, wherein the performing the sorted merge comprises: comparing a value in a top row of each in-memory buffer with one another; reading out the top row having a lowest value to the distinct or ordered operator; and iteratively repeating the comparing and the reading out the top row.

In Example 8, the subject matter of Examples 1-7 comprises, wherein the operations further comprise: in response to a determination that a given in-memory buffer is empty, moving out another plurality of rows from a partition corresponding to the given in-memory buffer.

Example 9 is a method comprising: receiving a database command the database command comprising a group-by operator having a memory budget and a distinct or ordered operator; grouping data into a plurality of different groups using the group-by operator, the grouping comprising creating a separate linked list in memory for each group of the plurality of different groups; writing each separate linked list to a different partition on a disk; for each partition on the disk: writing rows from a corresponding partition into the memory; sorting the rows; writing the sorted rows back to the corresponding partition; and moving a plurality of rows from the corresponding partition into an in-memory buffer unique to the corresponding partition; performing a sorted merge on the in-memory buffers, reading out each row output by the sorted merge into the distinct or ordered operator; and running the distinct or ordered operator on each row received from the in-memory buffers, until the distinct or ordered operator produces a result.

In Example 10, the subject matter of Example 9 comprises, wherein the writing each separate linked list, the writing rows from a corresponding partition, the sorting the rows, the writing the sorted rows, and the moving the plurality of rows are performed in response to a determination that a memory allocated to all of the separate linked lists is within a predetermined threshold amount of memory from the memory budget.

In Example 11, the subject matter of Examples 9-10 comprises, wherein the distinct or ordered operator is a median operator.

In Example 12, the subject matter of Examples 9-11 comprises, wherein the distinct or ordered operator is a distinct count operator.

In Example 13, the subject matter of Examples 11-12 comprises, the row is received, wherein M is equal to a total number of rows in all of the different partitions, and then outputting a value in a next received row as a solution to the median operator.

In Example 14, the subject matter of Example 13 comprises, assigning a per-group memory budget to each group in the plurality of different groups, based on the memory budget of the group-by operator; and in response to a determination that the corresponding partition for a given group is within a predetermined threshold amount of memory from the per-group memory budget, creating another corresponding partition for the given group for additional values from the linked list corresponding to the given group.

In Example 15, the subject matter of Examples 9-14 comprises, wherein the performing the sorted merge comprises: comparing a value in a top row of each in-memory buffer with one another; reading out the top row having a lowest value to the distinct or ordered operator; and iteratively repeating the comparing and the reading out the top row.

In Example 16, the subject matter of Examples 9-15 comprises, in response to a determination that a given in-memory buffer is empty, moving out another plurality of rows from a partition corresponding to the given in-memory buffer.

Example 17 is a non-transitory machine-readable medium storing instructions which, when executed by one or more processors, cause the one or more processors to perform operations comprising: receiving a database command the database command comprising a group-by operator having a memory budget and a distinct or ordered operator; grouping data into a plurality of different groups using the group-by operator, the grouping comprising creating a separate linked list in memory for each group of the plurality of different groups; writing each separate linked list to a different partition on a disk; for each partition on the disk: writing rows from a corresponding partition into the memory; sorting the rows; writing the sorted rows back to the corresponding partition; and moving a plurality of rows from the corresponding partition into an in-memory buffer unique to the corresponding partition; performing a sorted merge on the in-memory buffers, reading out each row output by the sorted merge into the distinct or ordered operator; and running the distinct or ordered operator on each row received from the in-memory buffers, until the distinct or ordered operator produces a result.

In Example 18, the subject matter of Example 17 comprises, wherein the writing each separate linked list, the writing rows from a corresponding partition, the sorting the rows, the writing the sorted rows, and the moving the plurality of rows are performed in response to a determination that a memory allocated to all of the separate linked lists is within a predetermined threshold amount of memory from the memory budget.

In Example 19, the subject matter of Examples 17-18 comprises, wherein the distinct or ordered operator is a median operator.

In Example 20, the subject matter of Examples 17-19 comprises, wherein the distinct or ordered operator is a distinct count operator.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 4:
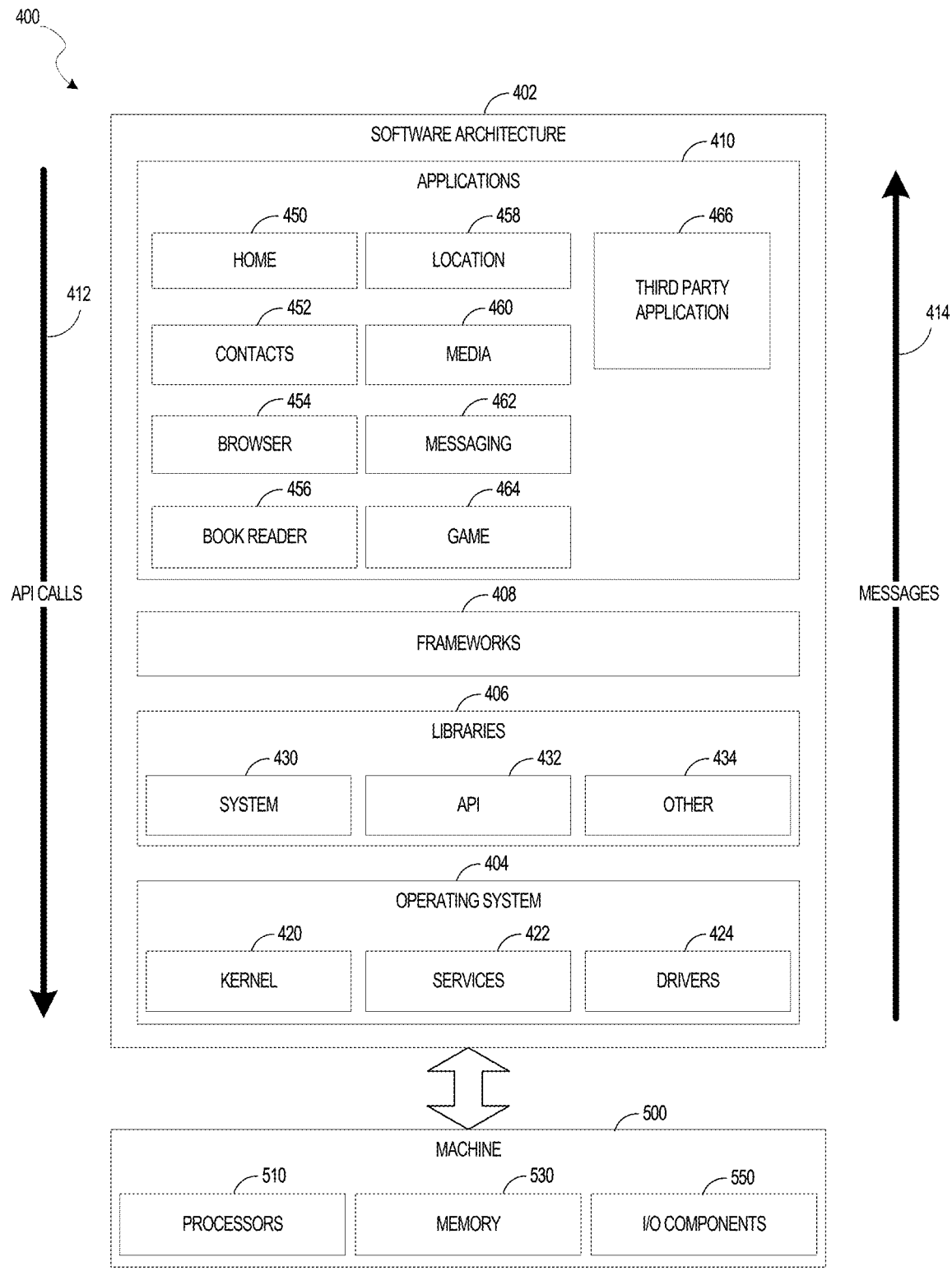
FIG. 4 is a block diagram illustrating a software architecture, in accordance with an example embodiment.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that comprises processors 510, memory 530, and input/output (I/O) components 550. In this example architecture, the software architecture 402 can be conceptualized as a stack of layers where each layer may provide a particular functionality. For example, the software architecture 402 comprises layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 comprises, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionality. The services 422 can provide other common services for the other software layers. The drivers 424 are responsible for controlling or interfacing with the underlying hardware. For instance, the drivers 424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (PEG or JPG), or Portable Network Graphics (PNG), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410. For example, the frameworks 408 provide various graphical user interface functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. The applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit [SDK] by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
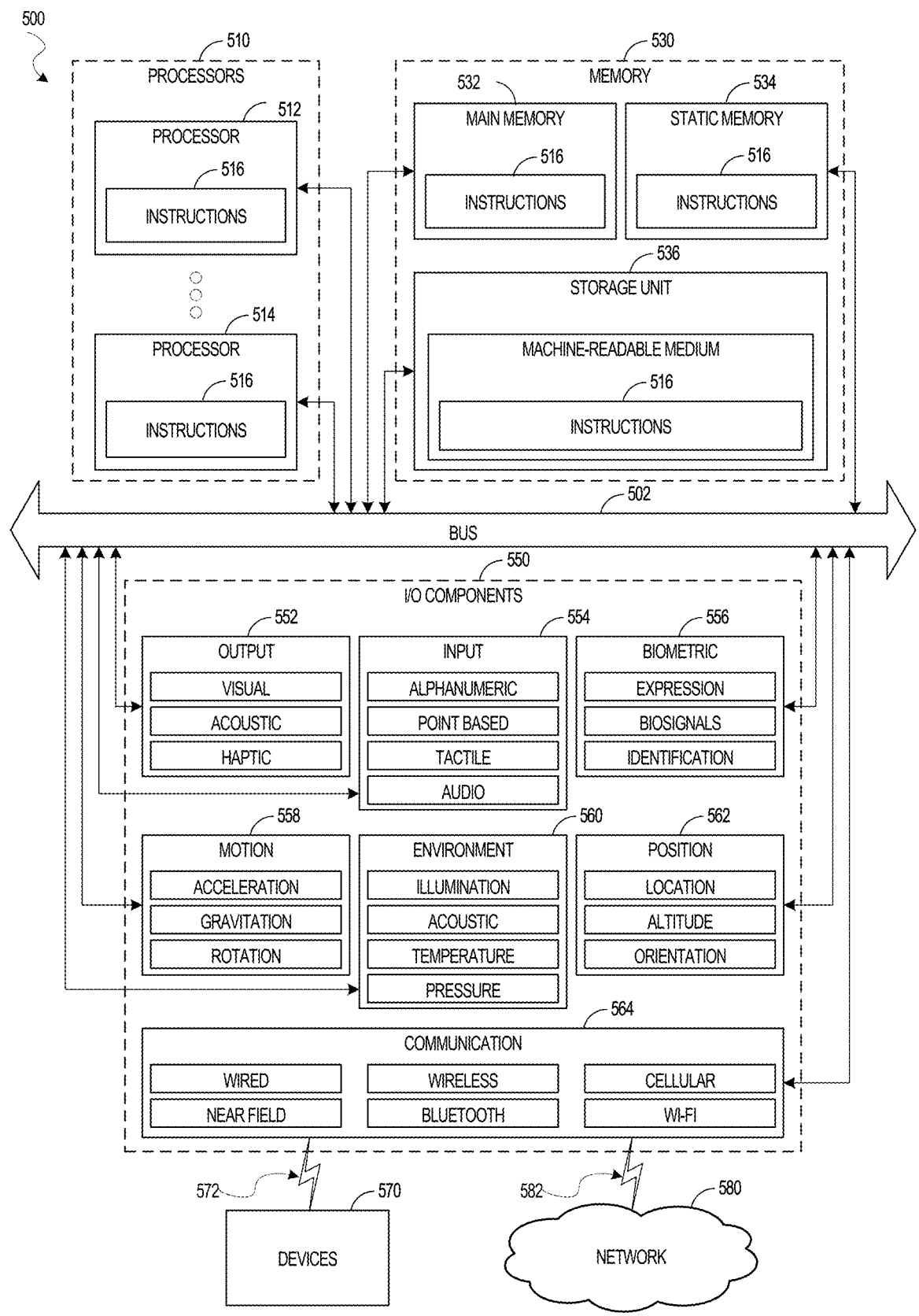
FIG. 5 illustrates a diagrammatic representation of a machine in the form of a computer system within which a set of instructions may be executed for causing the machine to perform any one or more of the methodologies discussed herein.

FIG. 5 illustrates a diagrammatic representation of a machine 500 in the form of a computer system within which a set of instructions may be executed for causing the machine 500 to perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the method 300 of FIG. 3. Additionally, or alternatively, the instructions 516 may implement FIGS. 1-3 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer [or distributed] network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device [e.g., a smart watch], a smart home device [e.g., a smart appliance], other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit [CPU], a reduced instruction set computing [RISC] processor, a complex instruction set computing [CISC] processor, a graphics processing unit [GPU], a digital signal processor [DSP], an application-specific integrated circuit [ASIC], a radio-frequency integrated circuit [RFIC], another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel [PDP], a light-emitting diode [LED] display, a liquid crystal display [LCD], a projector, or a cathode ray tube [CRT], acoustic components [e.g., speakers]), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System [GPS] receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or include components operable to detect identifiers. For example, the communication components 564 may include radio-frequency identification (RFID) tag reader components, NFC smart tag detection components, optical reader components (e.g., an optical sensor to detect one-dimensional bar codes such as Universal Product Code [UPC] bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (i.e., 530, 532, 534, and/or memory of the processor(s) 510) and/or the storage unit 536 may store one or more sets of instructions 516 and data structures (e.g., software) embodied or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580, may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., Hypertext Transfer Protocol [HTTP]). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor;
   a computer-readable medium storing instructions that, when executed by the at least one hardware processor, cause the at least one hardware processor to perform operations comprising:
      receiving a database command, the database command comprising a group-by operator having a memory budget and a distinct or ordered operator;
      grouping data into a plurality of different groups using the group-by operator, the grouping comprising creating a separate linked list in memory for each group of the plurality of different groups;
      writing each separate linked list to a different partition on a disk;
      for each partition on the disk:
         writing rows from a corresponding partition into the memory;
         sorting the rows;
         writing the sorted rows back to the corresponding partition; and
         moving a plurality of rows from the corresponding partition into an in-memory buffer unique to the corresponding partition;
      performing a sorted merge on the in-memory buffers, reading out each row output by the sorted merge into the distinct or ordered operator; and
      running the distinct or ordered operator on each row received from the in-memory buffers, until the distinct or ordered operator produces a result.

2. The system of claim 1, wherein the writing each separate linked list, the writing rows from a corresponding partition, the sorting the rows, the writing the sorted rows, and the moving the plurality of rows are performed in response to a determination that a memory allocated to all of the separate linked lists is within a predetermined threshold amount of memory from the memory budget.

3. The system of claim 1, wherein the distinct or ordered operator is a median operator.

4. The system of claim 1, wherein the distinct or ordered operator is a distinct count operator.

5. The system of claim 3, wherein the running comprises counting a number of rows that are received by the median operator until an M/2th row is received, wherein M is equal to a total number of rows in all of the different partitions, and then outputting a value in a next received row as a solution to the median operator.

6. The system of claim 3, wherein the operations further comprise:
   assigning a per-group memory budget to each group in the plurality of different groups, based on the memory budget of the group-by operator; and
   in response to a determination that the corresponding partition for a given group is within a predetermined threshold amount of memory from the per-group memory budget, creating another corresponding partition for the given group for additional values from the linked list for the given group.

7. The system of claim 1, wherein the performing the sorted merge comprises:
   comparing a value in a top row of each in-memory buffer with one another;
   reading out the top row having a lowest value to the distinct or ordered operator; and
   iteratively repeating the comparing and the reading out the top row.

8. The system of claim 1, wherein the operations further comprise:
   in response to a determination that a given in-memory buffer is empty, moving out another plurality of rows from a partition corresponding to the given in-memory buffer.

9. A method comprising:
   receiving a database command, the database command comprising a group-by operator having a memory budget and a distinct or ordered operator;
   grouping data into a plurality of different groups using the group-by operator, the grouping comprising creating a separate linked list in memory for each group of the plurality of different groups;
   writing each separate linked list to a different partition on a disk;
   for each partition on the disk:
      writing rows from a corresponding partition into the memory;
      sorting the rows;
      writing the sorted rows back to the corresponding partition; and
      moving a plurality of rows from the corresponding partition into an in-memory buffer unique to the corresponding partition;
   performing a sorted merge on the in-memory buffers, reading out each row output by the sorted merge into the distinct or ordered operator; and
   running the distinct or ordered operator on each row received from the in-memory buffers, until the distinct or ordered operator produces a result.

10. The method of claim 9, further comprising:
    wherein the writing each separate linked list, the writing rows from a corresponding partition, the sorting the rows, the writing the sorted rows, and the moving the plurality of rows are performed in response to a determination that a memory allocated to all of the separate linked lists is within a predetermined threshold amount of memory from the memory budget.

11. The method of claim 9, wherein the distinct or ordered operator is a median operator.

12. The method of claim 9, wherein the distinct or ordered operator is a distinct count operator.

13. The method of claim 11, wherein the running comprises counting a number of rows that are received by the median operator until an M/2th row is received, wherein M is equal to a total number of rows in all of the different partitions, and then outputting a value in a next received row as a solution to the median operator.

14. The method of claim 13, further comprising:
assigning a per-group memory budget to each group in the plurality of different groups, based on the memory budget of the group-by operator; and
in response to a determination that the corresponding partition for a given group is within a predetermined threshold amount of memory from the per-group memory budget, creating another corresponding partition for the given group for additional values from the linked list for the given group.

15. The method of claim 9, wherein the performing the sorted merge comprises:
comparing a value in a top row of each in-memory buffer with one another;
reading out the top row having a lowest value to the distinct or ordered operator; and
iteratively repeating the comparing and the reading out the top row.

16. The method of claim 9, further comprising:
in response to a determination that a given in-memory buffer is empty, moving out another plurality of rows from a partition corresponding to the given in-memory buffer.

17. A non-transitory machine-readable medium storing instructions which, when executed by one or more processors, cause the one or more processors to perform operations comprising:

receiving a database command, the database command comprising a group-by operator having a memory budget and a distinct or ordered operator;
grouping data into a plurality of different groups using the group-by operator, the grouping comprising creating a separate linked list in memory for each group of the plurality of different groups;
writing each separate linked list to a different partition on a disk;
for each partition on the disk:
writing rows from a corresponding partition into the memory;
sorting the rows;
writing the sorted rows back to the corresponding partition; and
moving a plurality of rows from the corresponding partition into an in-memory buffer unique to the corresponding partition;
performing a sorted merge on the in-memory buffers, reading out each row output by the sorted merge into the distinct or ordered operator; and
running the distinct or ordered operator on each row received from the in-memory buffers, until the distinct or ordered operator produces a result.

18. The non-transitory machine-readable medium of claim 17, wherein the operations further comprise:
wherein the writing each separate linked list, the writing rows from a corresponding partition, the sorting the rows, the writing the sorted rows, and the moving the plurality of rows are performed in response to a determination that a memory allocated to all of the separate linked lists is within a predetermined threshold amount of memory from the memory budget.

19. The non-transitory machine-readable medium of claim 17, wherein the distinct or ordered operator is a median operator.

20. The non-transitory machine-readable medium of claim 17, wherein the distinct or ordered operator is a distinct count operator.

* * * * *